US007415795B2

(12) United States Patent
Butler

(10) Patent No.: US 7,415,795 B2
(45) Date of Patent: Aug. 26, 2008

(54) CUTTINGS RECEPTACLE

(76) Inventor: Koni J. Butler, 13801 Crest Glen Rd., Edmond, OK (US) 73013

( * ) Notice: Subject to any disclaimer, the term of this patent is extended or adjusted under 35 U.S.C. 154(b) by 0 days.

(21) Appl. No.: 11/634,635

(22) Filed: Dec. 6, 2006

(65) Prior Publication Data

US 2007/0084112 A1     Apr. 19, 2007

Related U.S. Application Data

(62) Division of application No. 10/918,671, filed on Aug. 13, 2004, now abandoned.

(60) Provisional application No. 60/495,003, filed on Aug. 14, 2003.

(51) Int. Cl.
*A01G 17/10* (2006.01)
(52) U.S. Cl. .................................. 47/1.01 R
(58) Field of Classification Search ............... 15/238, 15/257.1; 47/1.01 R, 9, 25, 32, 58.1 F; 56/1, 56/329, 328.1; 294/1.3; D8/1; D34/1
See application file for complete search history.

(56) References Cited

U.S. PATENT DOCUMENTS

| 1,110,377 | A | * | 9/1914 | Cowles | 47/32 |
| 1,115,089 | A | * | 10/1914 | Mosier | 47/73 |
| 1,453,810 | A | * | 5/1923 | Sleen | 47/31 |
| 1,931,602 | A | * | 10/1933 | Colman | 47/32 |
| 2,017,308 | A | * | 10/1935 | Elmer | 47/77 |
| 2,519,678 | A | * | 8/1950 | MacKenzie | 56/329 |
| 3,745,974 | A | * | 7/1973 | Karasz | 294/1.3 |
| 4,308,688 | A | * | 1/1982 | Revane | 47/32.7 |
| 4,573,310 | A | * | 3/1986 | Friedel | 56/329 |
| 4,761,944 | A | * | 8/1988 | Glisan | 56/329 |
| 5,085,001 | A | * | 2/1992 | Crawley | 47/9 |
| 5,528,855 | A | * | 6/1996 | Kapphahn | 47/32 |
| D380,127 | S | * | 6/1997 | Feigh et al. | D8/1 |
| D424,386 | S | * | 5/2000 | Lundeen et al. | D8/1 |

* cited by examiner

*Primary Examiner*—Francis T Palo
(74) *Attorney, Agent, or Firm*—Dunlap Codding, P.C.

(57) ABSTRACT

A method for catching shrub or hedge cuttings. The method includes a setup of providing a at least one frame assembly with a first side, a spatially disposed second side, a distal side, and a bottom, which cooperate to form a catching area. The receptacle may be made from two frame assemblies of differing widths so that the assemblies can be telescopically positioned to form a generally continuous receptacle, and for compact storage. The receptacle may have a cutout in the bottom to allow for positioning the receptacle around a trunk of a shrub.

3 Claims, 3 Drawing Sheets

CUTTINGS RECEPTACLE

CROSS REFERENCE TO RELATED APPLICATIONS

This application is a divisional application of U.S. Ser. No. 10/918,671, filed Aug. 13, 2004, now abandoned, which claims the benefit under 35 U.S.C. 119(e) of U.S. Provisional Application Ser. No. 60/495,003 filed Aug. 14, 2003. The entire disclosures of both applications are hereby expressly incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present invention relates generally to a receptacle and more particularly, but not by way of limitation, to a receptacle and a method for catching and collecting shrub cuttings.

2. Brief Description of the Related Art

With the planting of shrubs comes the task of trimming. Shrubs are trimmed to remove dead leaves and branches or for providing a decorative effect. One problem that occurs during the trimming of shrubs relates to the difficulty of picking the cuttings out of ground cover, such as volcanic rock, wood chips, stone, and the like, which are used under shrubs for decorative purposes and for controlling weeds. More specifically, as the shrub is trimmed, the cuttings fall and collect in the ground cover directly beneath and around the shrub.

To this end, a need exists for a receptacle and method for collecting cuttings that accumulate from cutting shrubs. It is to such a receptacle and method that the present invention is directed.

DETAILED DESCRIPTION OF THE INVENTION

The term "shrub" when used herein means a shrub, bush, and any other plant, taken singly or in combination. The term "hedge" when used herein means a grouping of two or more shrubs.

Figure 1:
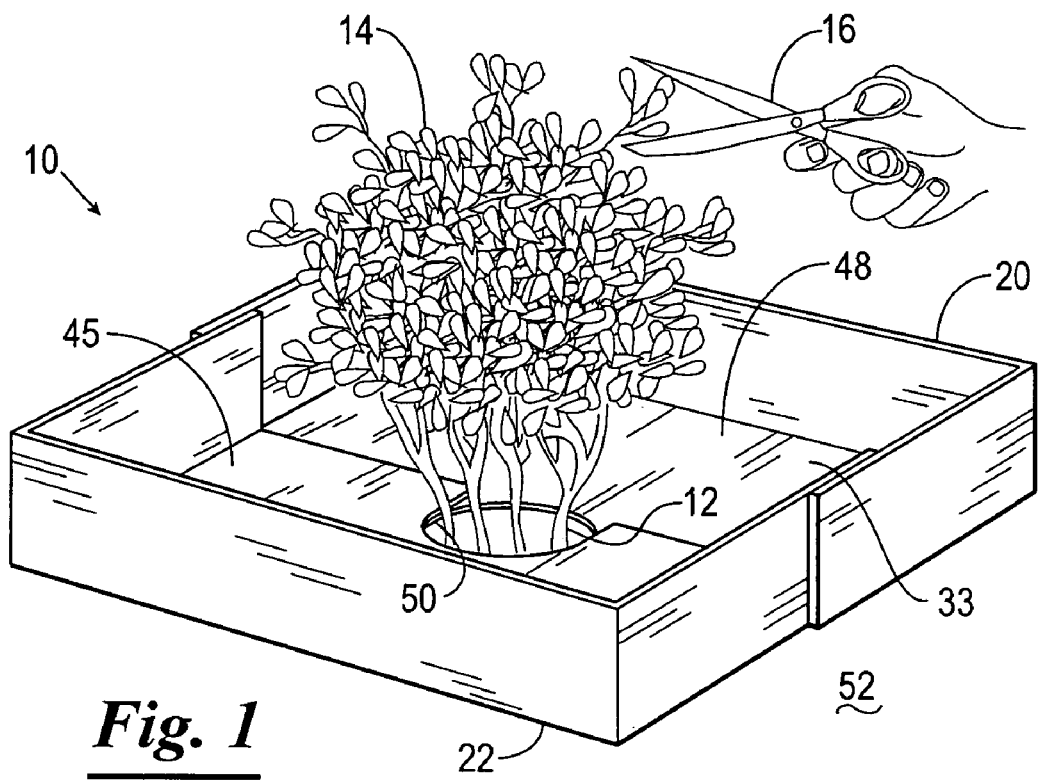
FIG. 1 is a perspective view of a receptacle constructed in accordance with the present invention positioned around a shrub being trimmed.
Figure 2:
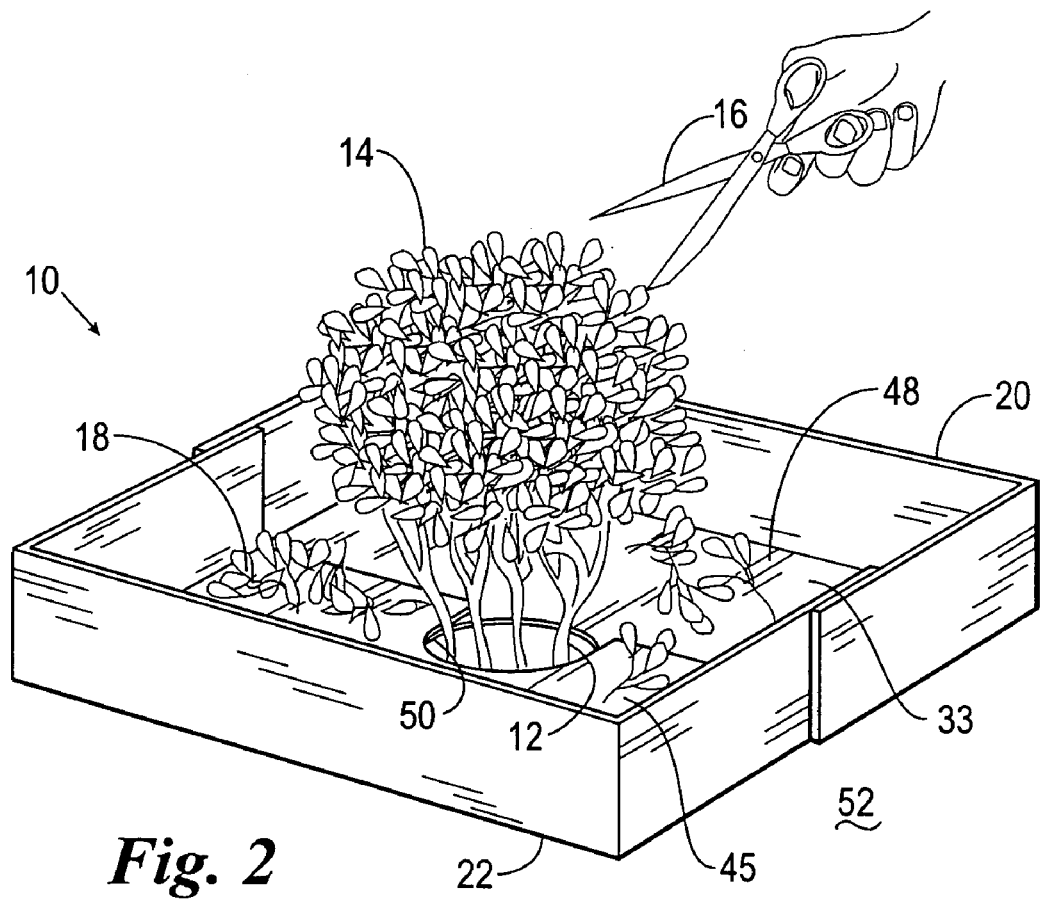
FIG. 2 is a perspective view of the receptacle of FIG. 1 containing shrub cuttings.

Referring now to the drawings, and in particular to FIG. 1, shown therein and designated by a reference numeral 10 is the preferred embodiment of a receptacle constructed in accordance with the present invention for catching shrub cuttings. The receptacle 10 is shown positioned about a trunk 12 of a shrub 14 while the shrub 14 is prepared to be trimmed with a pair of shears 16. While the receptacle 10 is shown being used with the shrub 14, it should be understood that the receptacle 10 may be positioned about the trunk or stem of any shrub, bush, hedge, or other plant to catch cuttings. Further, while shears 16 are shown being used to trim the shrub 14, any cutting device, such as electric or gas hedge trimmers, scissors, and the like may be used to trim the shrub 14. The receptacle 10 may be constructed from any suitable material, such as wood, metal, aluminum, rubber, cardboard, or a polymeric material and can be produced in various sizes and shapes depending on the size of the trunk of the shrub to be trimmed. In FIG. 2, cuttings 18 are shown being caught in the receptacle 10 upon trimming the cuttings 18 from the shrub 14.

As shown in FIGS. 1-4, the receptacle 10 is a box-like structure having a first frame assembly 20 and a second frame assembly 22. The first frame assembly 20 has a first side 24, a spatially disposed second side 26, a distal or back side 30, and a bottom 32. The first side 24, second side 26, distal side 30 and bottom 32 cooperate to form a first catching area 33. While the first frame assembly 20 is shown as being rectangular in shape, it should be understood that the first frame assembly 20 may be any shape, such as circular, oval, square, and the like, as long as the first frame assembly 20, in cooperation with the second frame assembly 22 function to provide a receptacle for catching cuttings from a shrub. The bottom 32 is provided with a first cutout 34 disposed in a front edge 35 of the bottom 32 such that the first cutout 34 is substantially centrally disposed between the first and second sides 24 and 26, respectively, of the first frame assembly 20. The first cutout 34 extends inwardly a selected distance from the front edge 35 of the bottom 32 toward the distal side 30 of the first frame assembly 20. The first cutout 34 may be any suitable shape and size.

The second frame assembly 22 has a first side 36, a spatially disposed second side 38, a distal or back side 42, and a bottom 44. The first side 36, second side 38, distal side 42, and bottom 44 cooperate to form a second catching area 45. While the second frame assembly 22 is shown as being rectangular in shape, it should be understood that the second frame assembly 22 may be any shape, such as circular, oval, square, and the like, as long as the second frame assembly 22, in cooperation with the first frame assembly 20, function to provide a receptacle for catching cuttings from a shrub. The bottom 44 is provided with a second cutout 46 disposed in a front edge 48 of the bottom 44 such that the second cutout 46 is substantially centrally disposed between the first and second sides 36 and 38, respectively, of the second frame assembly 22. The second cutout 46 extends inwardly a selected distance from the front edge 48 of the bottom 44 toward the distal side 42 of the second frame assembly 22. The second cutout 46 may be any suitable shape and size.

Figure 3:
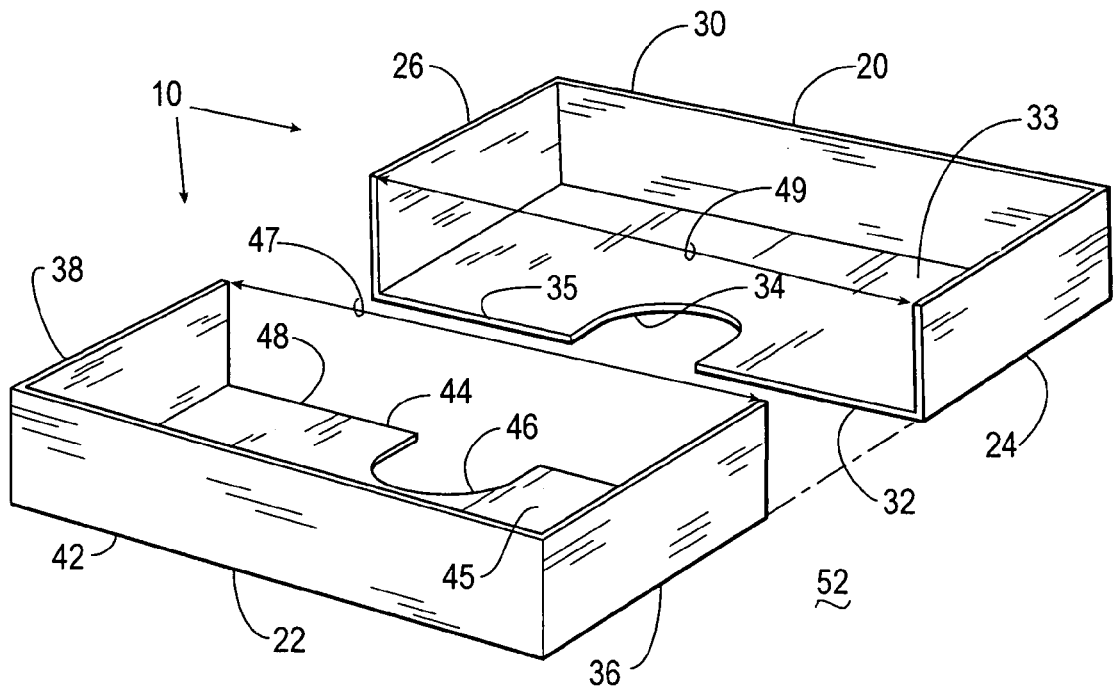
FIG. 3 is a perspective view of the receptacle in the unassembled position.
Figure 4:
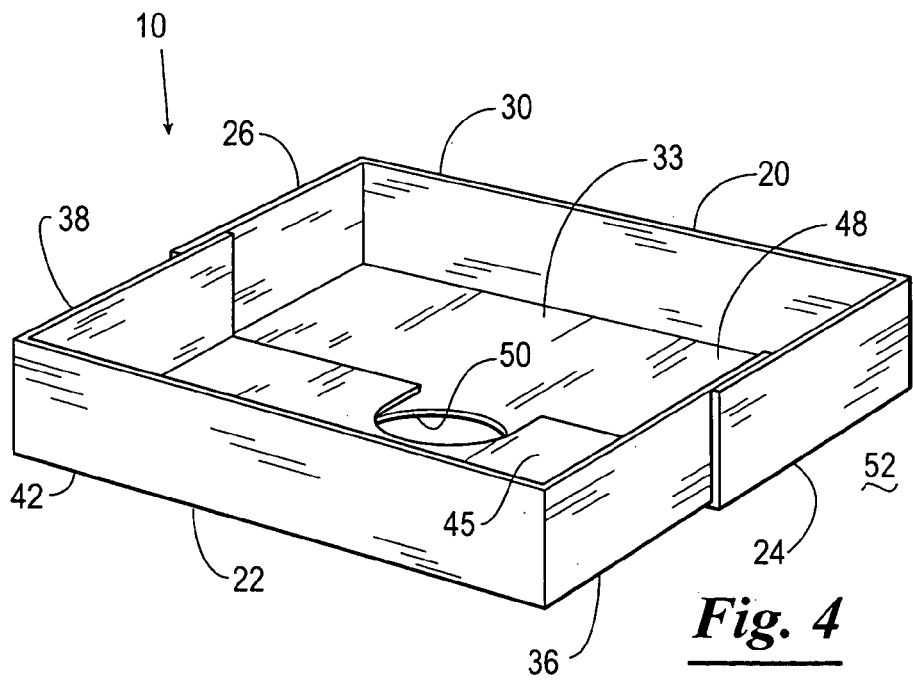
FIG. 4 is a perspective view of the receptacle in the assembled position.

The second frame assembly 22 is provided with a width 47 less than the width 49 of the first frame assembly 20 so that at least a portion of the second frame assembly 22 can be telescopically positioned within the first catching area 33 of the first frame assembly 20 substantially as shown in FIGS. 3 and 4. Thus, the first and second frame assemblies 20 and 22 cooperate to form the receptacle 10. While the receptacle 10 is shown in FIGS. 1-4 as a box-like structure, it should be understood that the receptacle 10 may be any shape, such as circular, oval, or the like. The first cutout 34 of the first frame assembly 20 and the second cutout 46 of the second frame assembly 22 cooperate to form an opening 50 for the trunk 12 of the shrub 14. The second frame assembly 22 and the first frame assembly 20 may increase and decrease the size of the receptacle 10, which also varies the size of the opening 50, by telescopically sliding the second frame assembly 22 with respect to the first frame assembly 20. The telescoping of the first frame assembly 20 and the second frame assembly 22 allows the receptacle 10 to be positioned about shrubs of various sizes.

To assemble the receptacle 10 for use with catching the cuttings 18 of the shrub 14, the first frame assembly 20 is positioned on the supporting surface 52 around the shrub 14 to be trimmed such that a portion of the trunk 12 of the shrub 14 is positioned within the first cutout 34 in the bottom 32 of the first frame assembly 20. The second frame assembly 22 is then positioned on the supporting surface 52 so as to be disposed opposite the first frame assembly 20. The second frame assembly 22 is slid or moved telescopically into the first catching area 33 of the first frame assembly 20 until the second cutout 46 in the bottom 44 of the second frame assembly 22 substantially abuts the trunk 12 of the shrub 14, thus, placing the receptacle 10 in the assembled position. This allows both the first and second cutouts, 34 and 46, while forming the opening 50 to have a substantially abutting relationship with the trunk 14 of the shrub 12.

Figure 5:
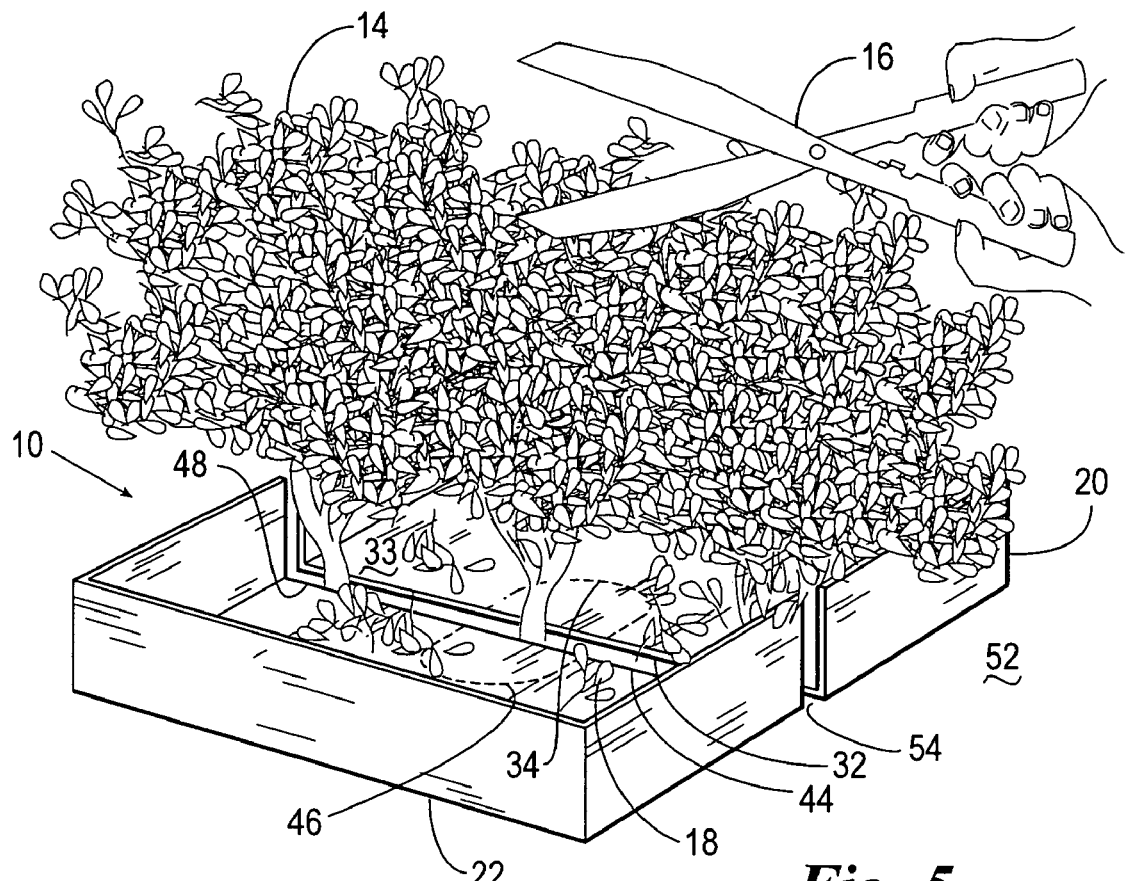
FIG. 5 is a perspective view of another embodiment of the receptacle positioned around a hedge being trimmed.
Figure 6:
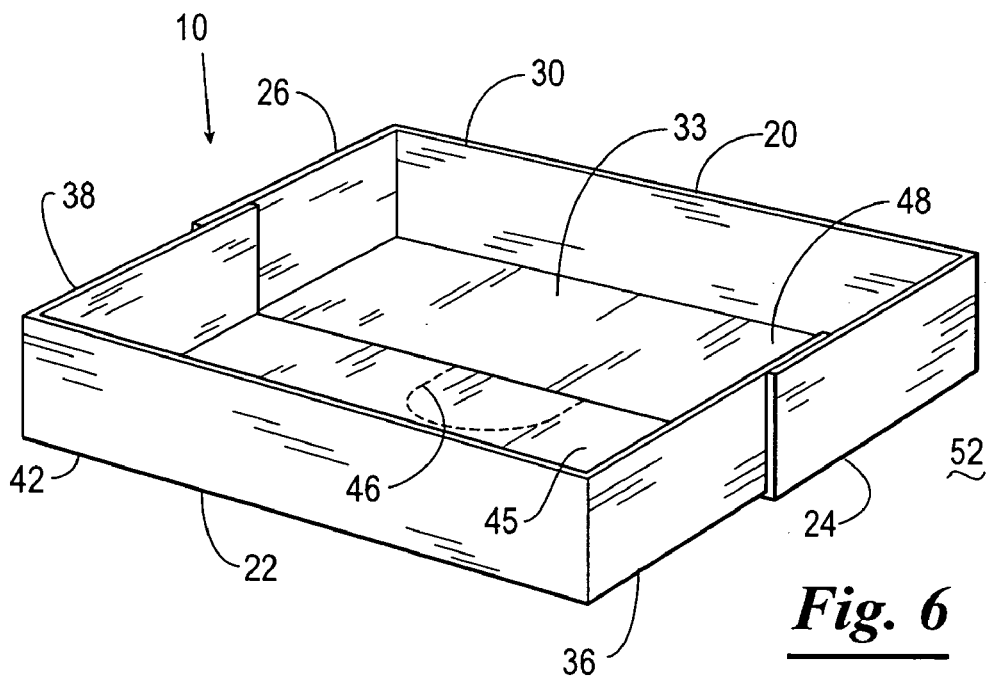
FIG. 6 is a perspective view of the receptacle of FIG. 5 in a partially closed position for storage.

FIGS. 5 and 6 illustrate another embodiment of the receptacle in which the first cutout, 34 and the second cutout, 46 consist of perforations rather than complete severance so as to allow the user to use the receptacle on a hedge as well as a single shrub.

The user may sever the first cutout 34 of the first frame assembly 20 and the second cutout 46 of the second frame assembly 22 to form the embodiment described in FIGS. 1-4. The user may alternatively leave the front edges, 35 and 48, of the bottoms, 32 and 44, of the frame assemblies 20 and 22 intact. The front edge 35 of the bottom 32 of the first frame assembly 20 and the front edge 48 of the bottom 44 of the second frame assembly 22 cooperate to form an opening 54 for the trunks of a hedge.

To assemble the receptacle 10 for use with catching the cuttings 18 of a hedge, the first frame assembly 20 is positioned on the supporting surface 52 on one side of the hedge to be trimmed such that the trunks are positioned along the front edge 35 of the bottom 32 of the first frame assembly 20. The second frame assembly 22 is then positioned on the supporting surface 52 so as to be disposed opposite the first frame assembly 20. The second frame assembly 22 is slid or moved telescopically toward the first catching area 33 of the first frame assembly 20 until the front edge 48 of the bottom 44 of the second frame assembly 22 substantially abuts the trunks of the hedge, thus, placing the receptacle 10 in the assembled position. This allows both the first and second frame assemblies, 20 and 22, while forming the opening 50 to have a substantially abutting relationship with the trunks of the hedge.

What is claimed is:

1. A method for assembling a receptacle for catching shrub cuttings, comprising:
    providing a first frame assembly and a second frame assembly, each of the first and second frame assemblies having a first side, a spatially disposed second side, a distal side, a bottom having a front edge spatially disposed from the distal side, and a perforated cutout area substantially centrally disposed in the bottom between the first side and the second side and extending inwardly a selected distance from the front edge of the bottom toward the distal side, the first, second, and distal sides each defining a planar wall extending upward from and in a normal relationship to the bottom, the first, second, and distal sides cooperating with the bottom to define a catching area, the bottom of the first frame assembly having a longer front edge than the bottom of the second frame assembly such that the second frame assembly may be telescopically positioned within at least a portion of the first frame assembly;
    positioning the first frame assembly on a supporting surface such that a trunk of a shrub is positioned substantially adjacent the front edge of the first frame assembly whereby the first frame assembly extends outwardly from the trunk of the shrub; and
    positioning the second frame assembly on the supporting surface such that the front edge of the bottom of the second frame assembly is disposed in a facing relationship with the front edge of the bottom of the first frame assembly and substantially adjacent the trunk of the shrub whereby the second frame assembly extends outwardly from the trunk of the shrub and the distal sides of the first frame assembly and the second frame assembly being remote from one another.

2. The method of claim 1 wherein the first and second frame assemblies are each provided with a cutout in the bottom thereof, and wherein the cutouts are created by removing the perforated cutout area of the first and second frame assemblies.

3. A method for assembling a receptacle for catching shrub cuttings, comprising:
    providing a first frame assembly and a second frame assembly, the first and second frame assemblies each having a first side, a spatially disposed second side, a distal side, a bottom having a front edge spatially disposed from the distal side, and a cutout substantially centrally disposed in the bottom between the first side and the second side and extending inwardly a selected distance from the front edge of the bottom toward the distal side, the first, second, and distal sides each defining a planar wall extending upward from and in a normal relationship to the bottom, the first, second, and distal sides cooperating with the bottom to define a catching area, the bottom of the first frame assembly having a longer front edge than the bottom of the second frame assembly such that the first and second frame assemblies may be telescopically positioned relative to one another to create a generally continuous receptacle around a shrub;
    positioning the first frame assembly on a supporting surface around the shrub such that at least a portion of a trunk of the shrub is positioned within the cutout of the first frame assembly and the distal side of the first frame assembly extends outwardly therefrom;
    positioning the second frame assembly on the supporting surface around the shrub opposite the first frame assembly such that the front edge of the bottom of the second frame assembly is supported on at least the front edge of the bottom of the first frame assembly and the distal sides of the first frame assembly and the second frame assembly are remote relative to one another; and
    moving the second frame assembly toward the shrub until at least a portion of the trunk of the shrub is positioned within the cutout of the second frame assembly whereby a portion of the second frame is telescopically disposed within the first frame assembly and the distal side of the second frame assembly extends outwardly therefrom whereby upon trimming the shrub, the cuttings fall into the catching area defined by the first and second frame assemblies.

* * * * *